(12) United States Patent
Wang et al.

(10) Patent No.: US 10,776,402 B2
(45) Date of Patent: Sep. 15, 2020

(54) MANUFACTURE PARAMETERS GROUPING AND ANALYZING METHOD, AND MANUFACTURE PARAMETERS GROUPING AND ANALYZING SYSTEM

(71) Applicant: UNITED MICROELECTRONICS CORP., Hsinchu (TW)

(72) Inventors: Li-Chin Wang, Tainan (TW); Ya-Ching Cheng, Hsinchu (TW); Chien-Hung Chen, Xinpu Township, Hsinchu County (TW); Chun-Liang Hou, Zhubei (TW); Da-Ching Liao, Taichung (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 210 days.

(21) Appl. No.: 15/820,662

(22) Filed: Nov. 22, 2017

(65) Prior Publication Data
US 2019/0087481 A1    Mar. 21, 2019

(30) Foreign Application Priority Data
Sep. 19, 2017    (TW) .............................. 106132141 A

(51) Int. Cl.
*G06F 17/00*    (2019.01)
*G06F 16/28*    (2019.01)
*G05B 19/418*    (2006.01)

(52) U.S. Cl.
CPC ....... *G06F 16/285* (2019.01); *G05B 19/4183* (2013.01); *G05B 2219/31318* (2013.01)

(58) Field of Classification Search
CPC .... G06F 16/9535; G06F 16/35; G06F 16/951; G06F 16/2365; G06F 16/243; G06F 16/2457
See application file for complete search history.

(56) References Cited

U.S. PATENT DOCUMENTS

| | | | |
|---|---|---|---|
| 2011/0060443 A1* | 3/2011 | Schwarm ............ | G05B 13/042 700/104 |
| 2012/0065762 A1* | 3/2012 | Pillarisetti ............ | G06Q 10/06 700/108 |
| 2018/0128757 A1* | 5/2018 | Reinis ................ | G01N 23/2076 |

* cited by examiner

*Primary Examiner* — Truong V Vo
(74) *Attorney, Agent, or Firm* — WPAT, PC

(57) ABSTRACT

A manufacture parameters grouping and analyzing method, and a manufacture parameters grouping and analyzing system are provided. The manufacture parameters grouping and analyzing method includes the following steps: A plurality of process factors are classified into a plurality of groups. In each of the groups, an intervening relationship between any two of the process factors is larger than a predetermined correlation value. In each of the groups, at least one representative factor is selected from each of the groups according to a plurality of outputting relationships of the process factors related to an output factor or a plurality of sample amounts of the process factors. Finally, the representative factor is used for various applications.

14 Claims, 8 Drawing Sheets

FIG. 4A

| | | X1 | X2 | X3 | X4 | X5 | X6 | X7 | X8 | X9 | X10 |
|---|---|---|---|---|---|---|---|---|---|---|---|
| | | 0.69 | 0.78 | 0.87 | 0.55 | 0.69 | 0.56 | 0.55 | 0.55 | 0.4 | 0.3 |
| 87 | X1 | 1 | 0.99 | 0.98 | 0.95 | 0.93 | 0.96 | 0.2 | 0.1 | 0.05 | X10 |
| 77 | X2 | 0.99 | 1 | 0.91 | 0.94 | 0.92 | 0.95 | | | | 0.01 |
| 66 | X3 | 0.98 | 1 | | | | | | | | |
| 81 | X4 | 0.95 | 0.91 | 1 | 0.96 | 0.91 | 0.89 | | | | |
| 87 | X5 | 0.93 | 0.94 | 0.96 | 1 | 0.86 | 0.87 | | 0.88 | 0.2 | 0.1 |
| 78 | X6 | 0.96 | 0.92 | 0.91 | 0.86 | 1 | 0.86 | 0.89 | | | |
| 99 | X7 | 0.2 | 0.95 | 0.89 | 0.87 | 0.86 | 1 | | | | |
| 87 | X8 | 0.1 | | | 0.89 | | | 1 | 0.91 | 0.91 | 0.01 |
| 80 | X9 | 0.05 | | | 0.88 | | | 0.91 | 1 | 1 | 0.001 |
| 70 | X10 | 0.01 | | | 0.2 | | | 0.01 | | 1 | 0.2 |
| | | | | | 0.1 | | | 0.001 | | 0.2 | 1 |

FIG. 4B

MANUFACTURE PARAMETERS GROUPING AND ANALYZING METHOD, AND MANUFACTURE PARAMETERS GROUPING AND ANALYZING SYSTEM

This application claims the benefit of Taiwan application Serial No. 106132141, filed Sep. 19, 2017, the subject matter of which is incorporated herein by reference.

BACKGROUND OF THE INVENTION

Field of the Invention

The invention relates in general to an analyzing method and an analyzing system, and more particularly to a manufacture parameters grouping and analyzing method and a manufacture parameters grouping and analyzing system.

Description of the Related Art

Along with the development of technology, the manufacturing process becomes complex. The analysis of the process factors can be used to improve the yield rate. However, the number of the process factors which affect the output factor may be quite large. It is needed to provide an appropriate method to analyze the process factors.

Because the number of the process factors is large, a great computing resource is needed and the multicollinearity issue may be occurred. In some conventional method, such as Principle Component Analysis, it is tried to reduce the number of dimensions. But, the dependency of the process factors cannot be described by the conventional method, and the transformed factors cannot be used to illustrate the manufacturing process.

SUMMARY OF THE INVENTION

The invention is directed to a manufacture parameters grouping and analyzing method, and a manufacture parameters grouping and analyzing system. The process factors are classified into a plurality of clusters according to the outputting relationships. The process factors in each of the clusters are classified into a plurality of groups according to the intervening relationships. One or two representative factors in each of the groups can be selected. The representative factors can be used to represent the groups. The representative factors can be used to avoid the multicollinearity and reduce the computing complexity.

According to a first aspect of the present invention, a manufacture parameters grouping and analyzing method is provided. The manufacture parameters grouping and analyzing method includes the following steps. A plurality of process factors are classified into a plurality of groups. In each of the groups, an intervening relationship between any two of the process factors is larger than a predetermined correlation value. At least one representative factor is selected from each of the groups. The representative factors are selected according to a plurality of outputting relationships of the process factors related to an output factor or a plurality of sample amounts of the process factors.

According to a second aspect of the present invention, a manufacture parameters grouping and analyzing system is provided. The manufacture parameters grouping and analyzing system includes a grouping unit and a representative unit. The grouping unit is for classifying a plurality of process factors into a plurality of groups. In each of the groups, an intervening relationship between any two of the process factors is larger than a predetermined correlation value. The representative unit is for selecting at least one representative factor from each of the groups according to a plurality of outputting relationships of the process factors related to an output factor or a plurality of sample amounts of the process factors.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 4A to 4B illustrate the step S140 and the step S150 in the manufacture parameters grouping and analyzing method.

DETAILED DESCRIPTION OF THE INVENTION

Figure 1:
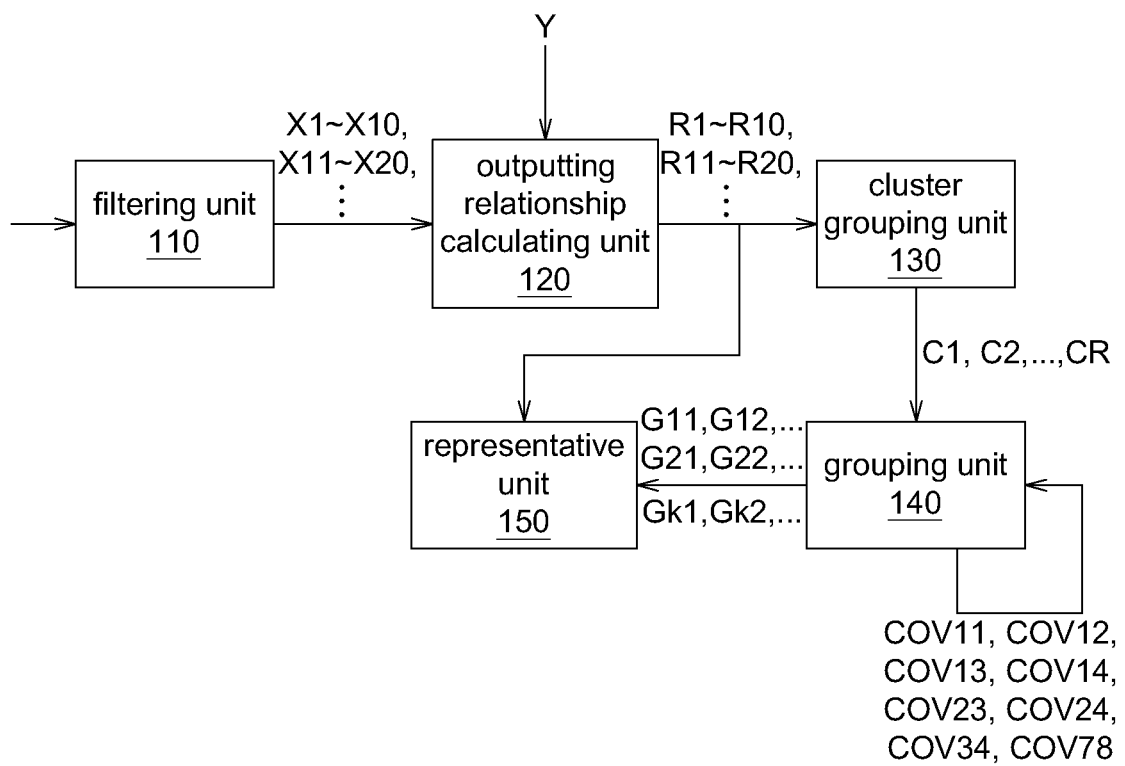
FIG. 1 shows a block diagram of a manufacture parameters grouping and analyzing system according to one embodiment.

Please refer to FIG. 1, which shows a block diagram of a manufacture parameters grouping and analyzing system 100 according to one embodiment. The manufacture parameters grouping and analyzing system 100 includes a filtering unit 110, an outputting relationship calculating unit 120, a cluster grouping unit 130, a grouping unit 140 and a representative unit 150. The manufacture parameters grouping and analyzing system 100 may be a chip, a circuit board, a circuit, or a non-transitory computer readable medium storing a plurality of program codes. The filtering unit 110 is used for performing a filtering process on a plurality of process factors. The outputting relationship calculating unit 120 is used for calculating an outputting relationship. The cluster grouping unit 130 is used for classifying the process factors into a plurality of clusters. The grouping unit 140 is used for classifying the process factors in each of the clusters into a plurality of groups. The representative unit 150 is used for selecting a representative factor from the group. That is to say, the cluster includes several groups, and several representative factors are selected from the groups respectively. The operation of the elements of the manufacture parameters grouping and analyzing system 100 is illustrated via a flowchart.

Figure 2:
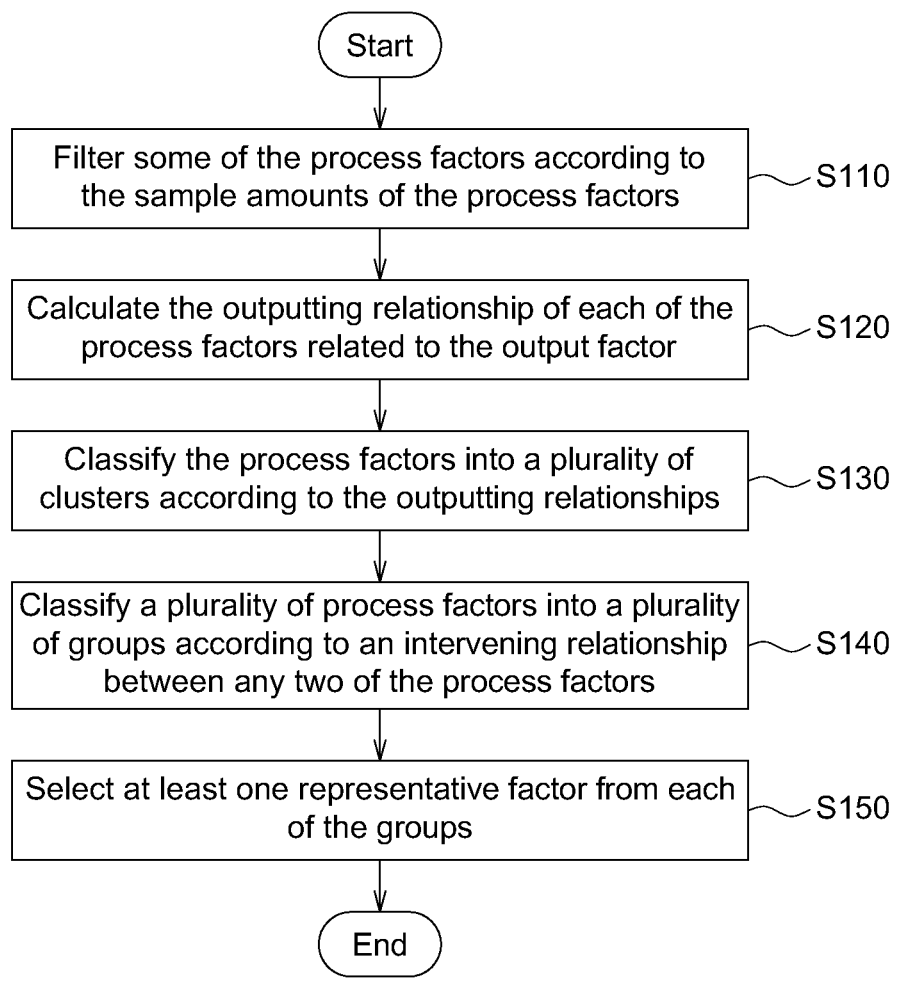
FIG. 2 shows a flowchart of a manufacture parameters grouping and analyzing method according to one embodiment.
Figure 3:
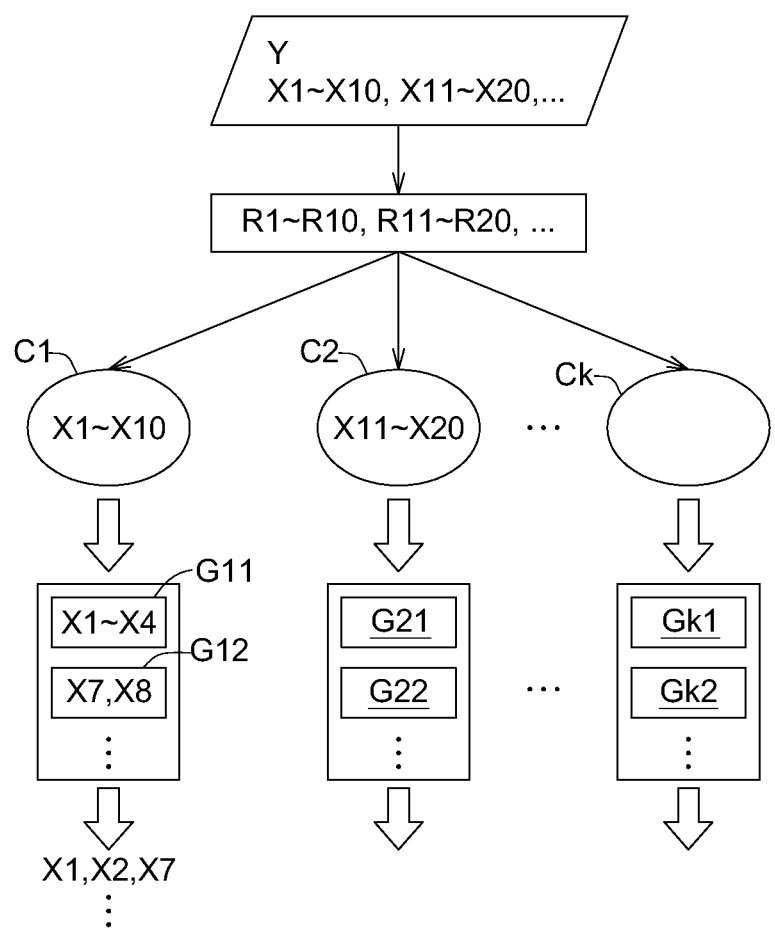
FIG. 3 illustrates each of the steps in FIG. 2.

Please refer to FIGS. 2 and 3. FIG. 2 shows a flowchart of a manufacture parameters grouping and analyzing method according to one embodiment. FIG. 3 illustrates each of the steps in FIG. 2. Firstly, in step S110, the filtering unit 110 filters some of the process factors according to the sample amounts of the process factors to obtain process factors X1 to X10, X11 to X20, . . . . The process factors X1 to X10, X11 to X20, . . . may be the WAT value in the semiconductor process. In this step, some of the process factors whose sample amount is lower than a threshold number are filtered and others of the process factors whose sample amount is large are remained.

Next, in step S120, the outputting relationship calculating unit 120 calculates the outputting relationships R1 to R10, R11 to R20, . . . of the process factors X1 to X10, X11 to X20, . . . related to an output factor Y, such as the yield of the semiconductor wafer. Each of the outputting relationships R1 to R10, R11 to R20, . . . may be an R-square, a Pearson's correlation coefficient, a Spearman's correlation coefficient, or a P value of Chi-square test.

Then, in step S130, the cluster grouping unit 130 classifies the process factors X1 to X10, X11 to X20, . . . into a plurality of clusters C1, C2, . . . Ck according to the outputting relationships R1 to R10, R11 to R20, . . . . In this step, the cluster grouping unit 130 can perform the classifying by K means algorithm, Jarvis-Patrick Clustering algorithm, Minimum Spanning Tree algorithm, EM Clustering algorithm. And, the cluster grouping unit 130 can learn the best number of the clusters by elbow method, artificial neural network (ANN) algorithm, ant colony optimization (ACO) algorithm, or Support Vector Machine (SVM) algorithm.

Next, in step S140, the grouping unit 140 classifies the process factors X1 to X10 in the cluster C1 into a plurality of groups G11, G12, . . . . For example, as shown in FIG. 3, the process factors X1 to X4 are classified into the group G11, the process factors X7, X8 are classified into the group G12. In the group G11, each of the intervening relationships COV12, COV13, COV14, COV23, COV24, COV34 (shown in FIG. 1) between any two of the process factors X1 to X4 is larger than a predetermined correlation value, such as 0.9025. In the group G12, the intervening relationship COV78 (shown in FIG. 1) between the process factor X7 and the process factor X8 is also larger than the predetermined correlation value. The step S140 is called as a Highly Correlated Covariates Grouping (HCCG) algorithm.

Then, in step S150, the representative unit 150 selects at least one representative factor from each of the groups G11, G12, . . . . For example, the representative unit 150 selects the process factors X1, X2 from the group G11, and the representative unit 150 selects the process factor X7 from the group G12.

The step S140 is also performed for the clusters C2, . . . , Ck to obtain the groups G21, G22, . . . Gk1, Gk2, . . . . The step S150 is also performed for the clusters C2, . . . , Ck to obtain the representative factors thereof.

Figure 4A:
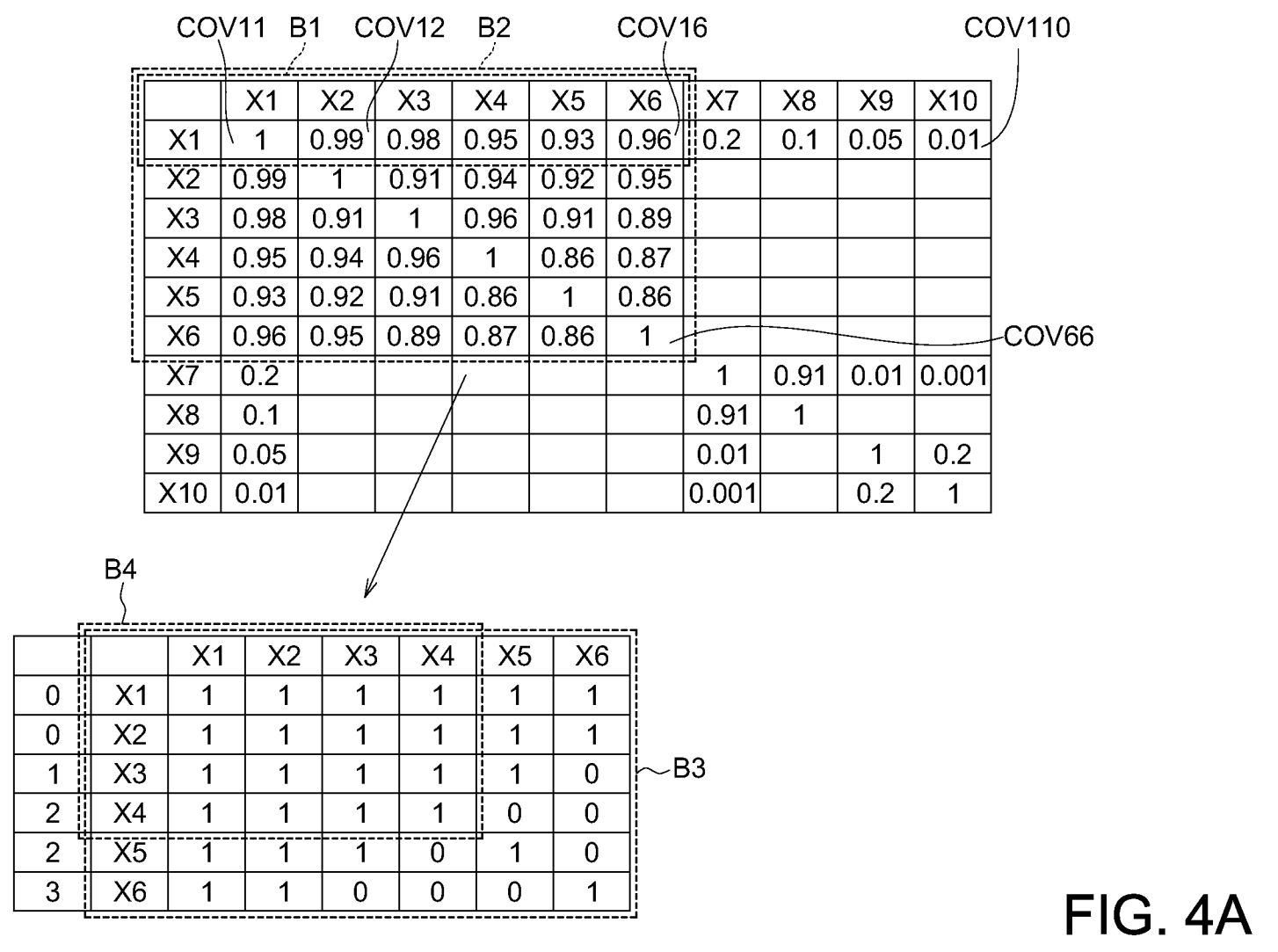

Please refer to FIGS. 4A to 4B, which illustrate the step S140 and the step S150 in the manufacture parameters grouping and analyzing method. Regarding the process factors X1 to X10 in the cluster C1, the process factor X1 which is the closest to the average of the process factors X1 to X10 is selected to be an initial factor.

Next, the intervening relationships COV12 to COV110, such as 0.99, 0.98, 0.95, 0.93, 0.96, 0.2, 0.1, 0.05, 0.01, between the process factor X1 and the process factors X2 to X10 are calculated. The intervening relationship between the process factor X1 and the process factor X1 is 1.

Then, if the intervening relationship between any of the process factors X1 to X10 and the process factor X1 is larger than the predetermined correlation value, such as 0.9025, then this process factor will be remained. In the block B1 of FIG. 4A, the intervening relationships COV11 to COV16 between the process factors X1 to X6 and the process factor X1 are larger than the predetermined correlation value, such as 0.9025, and the process factors X1 to X6 are remained.

Next, as shown in the block B2, the intervening relationships COV11 to COV66 in the intervening relationship matrix of the process factors X1 to X6 are calculated and recorded.

Then, in the block B2, if the sample amount of the combination of the two process factors is lower than a default number, then the value in the block B2 is changed to be 0. In FIG. 4A, all of the values in the block B2 are not changed to be 0.

Next, the block B2 which is the intervening relationship matrix is transformed to be a Boolean matrix. If any of the intervening relationships COV11 to COV66 is larger than the predetermined correlation value, such as 0.9025, then it is changed to be 1; if any of the intervening relationship COV11 to COV66 is not larger than the predetermined correlation value, such as 0.9025, then it is changed to be 0. The block B2 is changed to be the block B3 which is a Boolean matrix.

Then, the rows in the block B3 are arranged, such that the quantities of "0" in the rows of the block B3 are sequentially incremented. The columns in the block B3 are arranged, such that the quantities of "0" in the columns of the block B3 are sequentially incremented. In FIG. 4A, the block B3 is not needed to be changed.

Then, the coordinate of "0" is recorded. In the block B3 of FIG. 4A, the coordinates of "0" are "(3, 6), (4, 5), (4, 6), (5, 4), (5, 6), (6, 3), (6, 4), (6, 5)." The maximums in those coordinates are "6, 5, 6, 5, 6, 6, 6, 6." The minimum of "6, 5, 6, 5, 6, 6, 6" is "5." Then, "5" is used as a boundary line to obtain a block B4.

In the block B4, the process factors X1, X2, X3, X4 are classified into the group G11. The process factors X5, X6, X7, X8, X9, X10 are classified into group G12, . . . by the similar steps described above.

As shown in FIG. 4B, the outputting relationships R1 to R10 of the process factors X1 to X10 are recorded in the first row, and the sample amounts N1 to N10 of the process factors X1 to X10 are recorded in the first column. In the group G11 of the block B5, the process factor X3 whose outputting relationship is highest and the process factor X1 whose sample amount is highest are selected to be the representative factors. In other groups G12, . . . , the representative factors thereof can be selected by the similar way.

In one embodiment, only one process factor whose outputting relationship is the highest can be selected to be the representative factor. Or, in another embodiment, only one process factor whose sample amount is the highest can be selected to be the representative factor.

Based on above, the process factors can be classified into several clusters, each of the clusters can be divided into several groups by the HCCG algorithm, and the at least one representative factor of each of the groups can be selected. Those representative factors can be used to represent quite a lot of process factors. The intervening relation among the representative factors is low, so the multicollinearity issue can be avoided. The small amount of the representative factors can used to reduce the computing resource.

Figure 5:
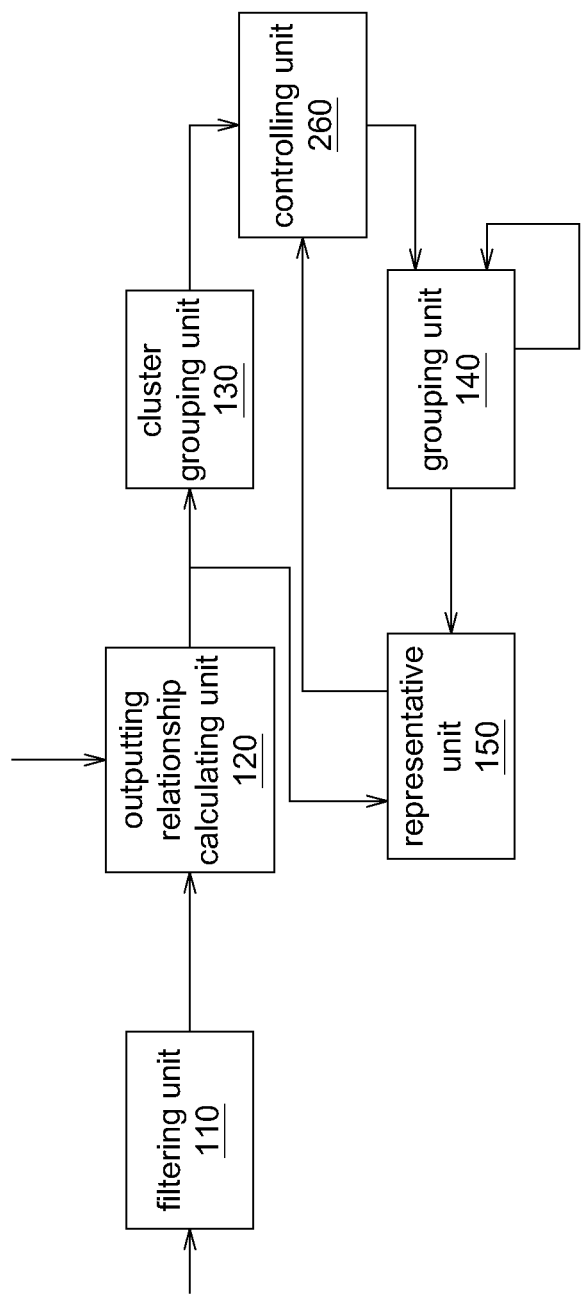
FIG. 5 shows a block diagram of a manufacture parameters grouping and analyzing system according to another embodiment.

Please refer to FIG. 5, which shows a block diagram of a manufacture parameters grouping and analyzing system 200 according to another embodiment. In another embodiment, parallel processing technology can be used in the manufacture parameters grouping and analyzing system 200 to improve the processing efficiency. The manufacture parameters grouping and analyzing system 200 further includes a controlling unit 260. The controlling unit 260 is used to divide each of the clusters into a plurality of parts. The parts can be performed the HCCG algorithm in parallel to improve the process efficiency.

Figure 6:
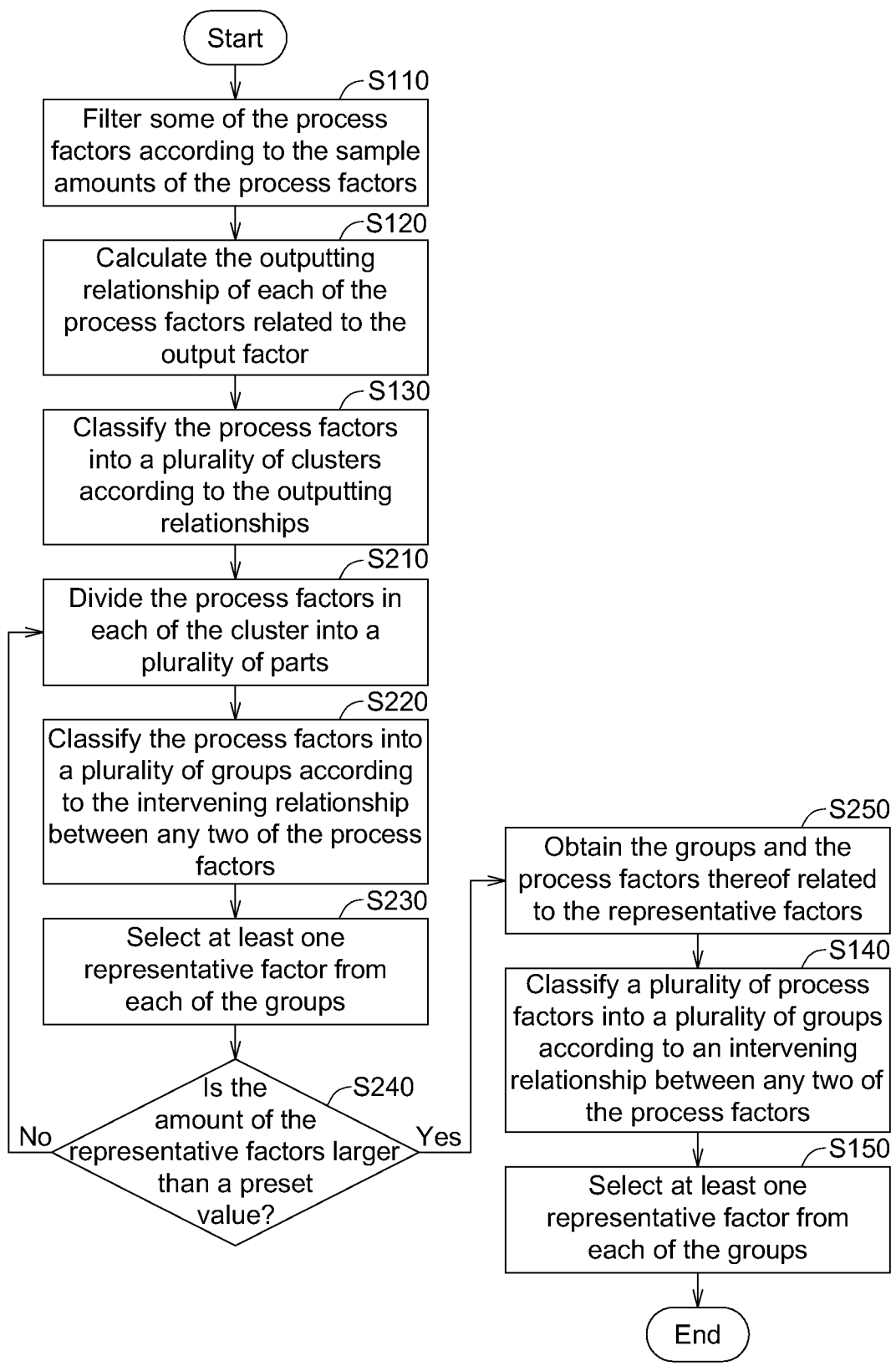
FIG. 6 shows a flowchart of a manufacture parameters grouping and analyzing method according to another embodiment.
Figure 7:
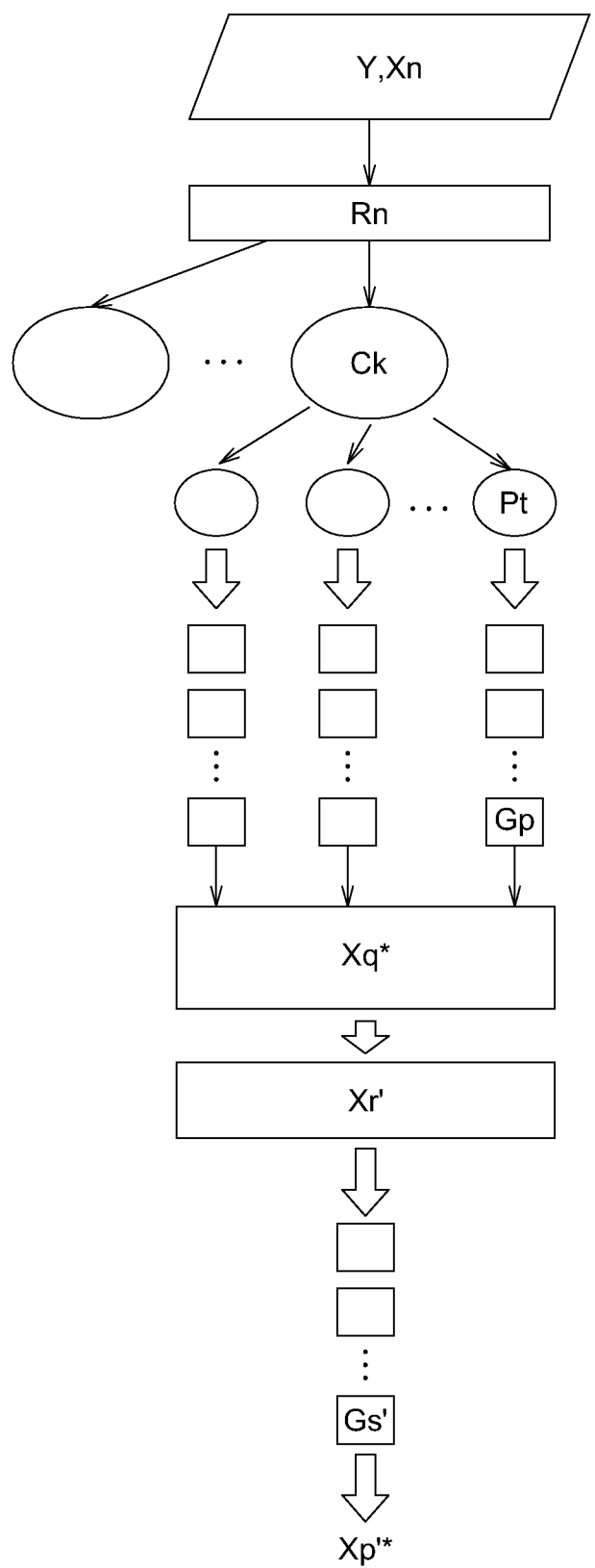
FIG. 7 illustrates each of the steps in FIG. 6.

Please refer to FIGS. 6 and 7. FIG. 6 shows a flowchart of a manufacture parameters grouping and analyzing method according to another embodiment. FIG. 7 illustrates each of the steps in FIG. 6. Firstly, in the steps S110 to S130 described in FIG. 2 above, the cluster grouping unit 130 classifies the process factors Xn into a plurality of clusters Ck according to a plurality of outputting relationships Rn.

Next, in step S210, the controlling unit 260 divides the process factors Xn in each of the clusters Ck into a plurality of parts Pt.

Then, in steps S220 and S230, the grouping unit 140 classifies the process factors Xn of each of the parts Pt into a plurality of groups Gp by the HCCG algorithm, and the representative unit 150 selects one representative factor Xq* from each of the groups Gp. The step S220 is similar to the step S140, and the step S230 is similar to the step S250. The similarities are not repeated here.

Next, in step S240, the controlling unit 260 determines whether the amount of the representative factors Xq* is larger than a preset value. If the amount of the representative factors Xq* is larger than the preset value, then the representative factor Xq* is deemed as a cluster, and the steps S210 to S230 are repeated. That is to say, some of the representative factors are selected to represent those representative factors.

If the amount of the representative factor Xq* is not larger than the preset value, then the process proceeds to step S250. In step S250, the controlling unit 260 obtains the groups and the process factors Xr' thereof related to the representative factors Xq*.

Next, in step S140, the grouping unit 140 classifies the process factors Xr' into a plurality of groups Gs' by the HCCG algorithm.

Then, the representative unit 150 selects the representative factor Xp'* from each of the groups Gs'.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A manufacture parameters grouping and analyzing method, comprising:
    classifying a plurality of process factors into a plurality of groups, wherein in each of the groups according to a Highly Correlated Covariates Grouping (HCCG) algorithm, an intervening relationship between any two of the process factors is larger than a predetermined correlation value; and
    selecting at least one representative factor from each of the groups according to a plurality of outputting relationships of the process factors related to an output factor or a plurality of sample amounts of the process factors;
    wherein in each of the groups, one of the at least one representative factor corresponds to the highest of the outputting relationships of the process factors related to the output factor and the largest of the sample amounts of the process factors; and
    wherein each of the outputting relationships of the process factors is a R-square, a Pearson's correlation coefficient, a Spearman's correlation coefficient, or a P value of Chi-square test, and the output factor is a yield of a semiconductor wafer.

2. The manufacture parameters grouping and analyzing method according to claim 1, further comprising:
    filtering some of the process factors according to the sample amounts of the process factors.

3. The manufacture parameters grouping and analyzing method according to claim 1, further comprising:
    calculating the outputting relationship of each of the process factors; and
    classifying the process factors into a plurality of clusters according to the outputting relationships.

4. The manufacture parameters grouping and analyzing method according to claim 3, wherein the step of classifying the process factors into the groups is performed once for each of the clusters.

5. The manufacture parameters grouping and analyzing method according to claim 1, wherein in the step of classifying the process factors into the groups, some of the process factors are selected to be classified into one of the groups according to the intervening relationships of the process factors.

6. The manufacture parameters grouping and analyzing method according to claim 5, wherein each of the intervening relationships of the process factors which are selected is higher than the predetermined correlation value.

7. The manufacture parameters grouping and analyzing method according to claim 1, further comprising:
    dividing the process factors into a plurality of parts;
    wherein the step of classifying the process factors into the groups and the step of selecting the representative factor are performed in each of the parts, the steps of classifying the process factors into the groups are performed in parallel, the steps of selecting the representative factor are performed in parallel.

8. A manufacture parameters grouping and analyzing system, comprising:
    a grouping unit for classifying a plurality of process factors into a plurality of groups, wherein in each of the groups according to a Highly Correlated Covariates Grouping (HCCG) algorithm, an intervening relationship between any two of the process factors is larger than a predetermined correlation value; and
    a representative unit for selecting at least one representative factor from each of the groups according to a plurality of outputting relationships of the process factors related to an output factor or a plurality of sample amounts of the process factors;
    wherein in each of the groups, one of the at least one representative factor corresponds to the highest of the outputting relationships of the process factors related to the output factor and the largest of the sample amounts of the process factors; and
    wherein each of the outputting relationships of the process factors is a R-square, a Pearson's correlation coefficient, a Spearman's correlation coefficient, or a P value of Chi-square test, and the output factor is a yield of a semiconductor wafer.

9. The manufacture parameters grouping and analyzing system according to claim 8, further comprising:
    a filtering unit for filtering some of the process factors according to the sample amounts of the process factors.

10. The manufacture parameters grouping and analyzing system according to claim 8, further comprising:

an outputting relationship calculating unit for calculating the outputting relationship of each of the process factors related to the output factor; and a cluster grouping unit for classifying the process factors into a plurality of clusters according to the outputting relationships.

11. The manufacture parameters grouping and analyzing system according to claim 10, wherein the grouping unit classifies the process factors into the groups once for each of the clusters.

12. The manufacture parameters grouping and analyzing system according to claim 8, wherein the grouping unit selects some of the process factors to be classified into one of the groups according to the intervening relationships of the process factors.

13. The manufacture parameters grouping and analyzing system according to claim 12, wherein each of the intervening relationships of the process factors which are selected is higher than the predetermined correlation value.

14. The manufacture parameters grouping and analyzing system according to claim 8, wherein a controlling unit is used for dividing the process factors into a plurality of parts, the process factors in the parts are classified into the groups in parallel and the representative factors of the groups in the parts are selected in parallel.

* * * * *